United States Patent
Denis et al.

(10) Patent No.: US 10,369,652 B2
(45) Date of Patent: Aug. 6, 2019

(54) WIRELESS AND POWERLINE COMMUNICATIONS IN A WELDING-TYPE SYSTEM

(71) Applicant: ILLINOIS TOOL WORKS INC., Glenview, IL (US)

(72) Inventors: Marc Lee Denis, Lena, WI (US); Benjamin Gene Peotter, Kaukauna, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 487 days.

(21) Appl. No.: 14/808,445

(22) Filed: Jul. 24, 2015

(65) Prior Publication Data

US 2017/0021442 A1  Jan. 26, 2017

(51) Int. Cl.

| H05B 7/11 | (2006.01) |
|---|---|
| B23K 9/09 | (2006.01) |
| B23K 9/10 | (2006.01) |
| H04W 4/70 | (2018.01) |
| B23K 9/12 | (2006.01) |
| H04L 27/18 | (2006.01) |

(52) U.S. Cl.
CPC .......... *B23K 9/1087* (2013.01); *B23K 9/1043* (2013.01); *B23K 9/125* (2013.01); *H04L 27/18* (2013.01); *H04W 4/70* (2018.02)

(58) Field of Classification Search
CPC .... B23K 9/1043; B23K 9/1087; B23K 9/125; H04L 27/18; H04W 4/005
USPC .......................... 219/132, 136, 137 R, 137 PS
See application file for complete search history.

(56) References Cited

U.S. PATENT DOCUMENTS

| 2,043,331 A | 6/1936 | Notvest |
| 2,175,891 A | 10/1939 | Graham |
| 2,526,597 A | 10/1950 | Winslow |

(Continued)

FOREIGN PATENT DOCUMENTS

| CN | 2353480 | 12/1999 |
| CN | 2384730 | 6/2000 |

(Continued)

OTHER PUBLICATIONS

"Monnit Wireless Sensors and iMonnit Online Monitoring System User Guide," Monnit Corporation, Oct. 2011.

(Continued)

*Primary Examiner* — Sang Y Paik
(74) *Attorney, Agent, or Firm* — McAndrews, Held & Malloy, Ltd.

(57) ABSTRACT

A welding-type system includes a wireless network interface configured to connect a wire feeder or power supply to a wireless network. The wireless network interface is also configured to receive a wireless command in a first format. The wireless command is configured to control the power supply. Moreover, the wireless network interface is configured to convert the wireless command from the first format to a second format. The welding-type system also includes a wired transceiver configured to transmit the converted wireless command across a power delivery cable to the power supply. Furthermore, the welding-type system includes power terminals configured to receive power from the power supply at a level based at least in part on the transmitted wireless command.

20 Claims, 5 Drawing Sheets

(56) References Cited

U.S. PATENT DOCUMENTS

| | | | |
|---|---|---|---|
| 2,617,913 A | 11/1952 | Oestreicher |
| 2,642,515 A | 6/1953 | Bagg |
| 3,496,328 A | 2/1970 | Moerke |
| 3,992,565 A | 11/1976 | Gatfield |
| 4,051,344 A | 9/1977 | Robbins |
| 4,079,231 A | 3/1978 | Toth |
| 4,147,919 A | 4/1979 | Matasovic |
| 4,216,367 A | 8/1980 | Risberg |
| 4,216,368 A | 8/1980 | Delay |
| 4,227,066 A | 10/1980 | Bulwidas |
| 4,247,752 A | 1/1981 | Stringer |
| 4,266,114 A | 5/1981 | Hansen |
| 4,410,789 A | 10/1983 | Story |
| 4,450,340 A | 5/1984 | Corrigall |
| 4,467,174 A | 8/1984 | Gilliland |
| 4,508,954 A | 4/1985 | Kroll |
| 4,521,672 A | 6/1985 | Fronius |
| 4,531,045 A | 7/1985 | Kemp |
| 4,561,059 A | 12/1985 | Davis |
| 4,584,685 A | 4/1986 | Gajjar |
| 4,608,482 A | 8/1986 | Cox |
| 4,641,292 A | 2/1987 | Tunnell |
| 4,767,908 A | 8/1988 | Dallavalle |
| 4,769,754 A | 9/1988 | Reynolds |
| 4,918,517 A | 4/1990 | Burgoon |
| 4,973,821 A | 11/1990 | Martin |
| 5,039,835 A | 8/1991 | Schwiete |
| 5,043,557 A | 8/1991 | Tabata |
| 5,063,282 A | 11/1991 | Gilliland |
| 5,276,305 A | 1/1994 | Hsien |
| 5,376,894 A | 12/1994 | Petranovich |
| 5,406,050 A | 4/1995 | Macomber |
| 5,499,178 A | 3/1996 | Mohan |
| 5,653,902 A | 8/1997 | Chang |
| 5,808,885 A | 9/1998 | Dew |
| 5,834,916 A | 11/1998 | Shimogama |
| 5,982,253 A | 11/1999 | Perrin |
| 6,016,528 A | 1/2000 | Jaramillo |
| 6,040,555 A | 3/2000 | Tiller |
| 6,087,622 A | 7/2000 | Summers |
| 6,091,048 A | 7/2000 | Lanouette |
| 6,096,994 A | 8/2000 | Handa |
| 6,103,994 A | 8/2000 | DeCoster |
| 6,114,657 A | 9/2000 | Hayes |
| 6,156,999 A | 12/2000 | Ignatchenko |
| 6,166,506 A | 12/2000 | Pratt |
| 6,225,596 B1 | 5/2001 | Chandler |
| 6,417,995 B1 | 7/2002 | Wu |
| 6,423,936 B1 | 7/2002 | Reed |
| 6,458,157 B1 | 10/2002 | Suaning |
| 6,479,791 B1 | 11/2002 | Kowaleski |
| 6,479,795 B1 | 11/2002 | Albrecht |
| 6,570,132 B1 | 5/2003 | Brunner |
| 6,583,386 B1 | 6/2003 | Ivkovich |
| 6,624,388 B1 | 9/2003 | Blankenship |
| 6,627,849 B2 | 9/2003 | Ihde |
| 6,636,776 B1 | 10/2003 | Barton |
| 6,653,597 B2 | 11/2003 | Baum |
| 6,734,393 B1 | 5/2004 | Friedl |
| 6,781,095 B2 | 8/2004 | Hayes |
| 6,818,860 B1 | 11/2004 | Stava |
| 6,867,386 B1 | 3/2005 | Niwa |
| 6,906,285 B2 | 6/2005 | Zucker |
| 6,909,066 B2 | 6/2005 | Zheng |
| 6,909,285 B2 | 6/2005 | Jordan |
| 7,038,167 B2 | 5/2006 | Hayes |
| 7,045,742 B2 | 5/2006 | Feichtinger |
| 7,205,503 B2 | 4/2007 | Reynolds |
| 7,245,875 B2 | 7/2007 | Clark |
| 7,294,808 B2 * | 11/2007 | Furman | B23K 9/095 219/132 |
| 7,307,241 B2 | 12/2007 | Hayes |
| 7,342,210 B2 | 3/2008 | Fergason |
| 7,363,137 B2 | 4/2008 | Brant |
| 7,375,304 B2 | 5/2008 | Kainec |
| 7,574,172 B2 | 8/2009 | Clark |
| 7,643,890 B1 | 1/2010 | Hillen |
| 7,761,336 B1 | 7/2010 | Blankenship |
| 7,810,937 B2 | 10/2010 | Garbergs |
| 7,873,495 B2 | 1/2011 | Lindell |
| 7,979,162 B2 | 7/2011 | Niemela |
| 7,996,276 B2 | 8/2011 | Blankenship |
| 8,239,532 B1 | 8/2012 | Roskind |
| 8,345,819 B2 | 1/2013 | Mastronardi |
| 8,471,525 B2 | 6/2013 | Kim |
| 8,569,646 B2 | 10/2013 | Daniel |
| 8,592,722 B2 | 11/2013 | Ulrich |
| 8,686,318 B2 | 4/2014 | Albrecht |
| 8,688,815 B2 | 4/2014 | Chantry |
| 8,711,750 B2 | 4/2014 | Ling |
| 8,747,116 B2 | 6/2014 | Zboray |
| 8,785,817 B2 | 7/2014 | Luck |
| 8,851,896 B2 | 10/2014 | Wallace |
| 2001/0043656 A1 | 11/2001 | Koslar |
| 2003/0062351 A1 | 4/2003 | Davidson |
| 2003/0089693 A1 | 5/2003 | Hayes |
| 2003/0177228 A1 | 9/2003 | Vigouroux |
| 2004/0026392 A1 | 2/2004 | Feichtinger |
| 2004/0156309 A1 * | 8/2004 | Chadha | H04L 27/2675 370/208 |
| 2004/0162630 A1 | 8/2004 | Hillen |
| 2004/0199846 A1 | 10/2004 | Matsumoto |
| 2005/0087523 A1 | 4/2005 | Zucker |
| 2005/0152294 A1 | 7/2005 | Yu |
| 2005/0199605 A1 | 9/2005 | Furman |
| 2005/0230372 A1 * | 10/2005 | Ott | B23K 9/1087 219/132 |
| 2006/0027546 A1 | 2/2006 | Reynolds |
| 2006/0076335 A1 | 4/2006 | Reynolds |
| 2006/0086706 A1 | 4/2006 | Ulrich |
| 2006/0138113 A1 | 6/2006 | Ott |
| 2006/0187842 A1 | 8/2006 | French |
| 2007/0080149 A1 | 4/2007 | Albrecht |
| 2007/0080150 A1 | 4/2007 | Albrecht |
| 2007/0080151 A1 | 4/2007 | Albrecht |
| 2007/0080152 A1 | 4/2007 | Albrecht |
| 2007/0080153 A1 | 4/2007 | Albrecht |
| 2007/0251932 A1 | 11/2007 | Vogel |
| 2008/0055154 A1 | 3/2008 | Martucci |
| 2008/0061049 A1 | 3/2008 | Albrecht |
| 2008/0116185 A1 | 5/2008 | Luck |
| 2008/0116186 A1 | 5/2008 | Luck |
| 2008/0149611 A1 | 6/2008 | Roth |
| 2009/0089300 A1 | 4/2009 | Vicente |
| 2009/0173726 A1 * | 7/2009 | Davidson | B23K 9/0956 219/130.01 |
| 2009/0200283 A1 | 8/2009 | Bland |
| 2009/0272221 A1 | 11/2009 | Long |
| 2009/0272222 A1 | 11/2009 | Long |
| 2010/0162079 A1 * | 6/2010 | Hwang | G06F 11/1048 714/758 |
| 2010/0176106 A1 | 7/2010 | Christensen |
| 2010/0314371 A1 | 12/2010 | Davidson |
| 2011/0073569 A1 | 3/2011 | Rappl |
| 2011/0133995 A1 | 6/2011 | Pascolini |
| 2011/0180517 A1 | 7/2011 | Schneider |
| 2011/0180522 A1 | 7/2011 | Bunker |
| 2011/0248008 A1 | 10/2011 | Long |
| 2012/0012561 A1 | 1/2012 | Wiryadinata |
| 2012/0102378 A1 * | 4/2012 | Matsumoto | H03M 13/2957 714/752 |
| 2013/0092672 A1 | 4/2013 | Peters |
| 2013/0112673 A1 | 5/2013 | Petrilla |
| 2013/0116849 A1 | 5/2013 | Kooken |
| 2013/0288211 A1 * | 10/2013 | Patterson | G09B 5/00 434/234 |
| 2014/0048522 A1 | 2/2014 | Dina |
| 2014/0049382 A1 | 2/2014 | Dina |
| 2014/0051358 A1 | 2/2014 | Dina |
| 2014/0051359 A1 | 2/2014 | Dina |
| 2014/0052832 A1 | 2/2014 | Dina |
| 2014/0144899 A1 | 5/2014 | Ulrich |
| 2015/0350821 A1 | 12/2015 | Dina |
| 2016/0165647 A1 | 6/2016 | Dina |

(56) References Cited

U.S. PATENT DOCUMENTS

FOREIGN PATENT DOCUMENTS

| | | |
|---|---|---|
| CN | 1841437 | 10/2006 |
| CN | 101378877 | 3/2009 |
| DE | 202006009014 | 8/2006 |
| EP | 0575082 | 12/1993 |
| EP | 1112800 A1 | 7/2001 |
| EP | 1586403 | 10/2005 |
| EP | 1681122 | 7/2006 |
| EP | 1833197 | 9/2007 |
| JP | 61137675 | 6/1986 |
| JP | 162966 | 6/1992 |
| JP | 04162964 | 6/1992 |
| JP | 04162966 | 6/1992 |
| JP | 05104248 | 2/1993 |
| JP | H10143226 | 5/1998 |
| JP | 2003088957 | 3/2003 |
| JP | 2003154455 | 5/2003 |
| JP | 2003191075 | 7/2003 |
| JP | 2003236663 | 8/2003 |
| JP | 2014240089 | 12/2014 |
| WO | 0112376 | 2/2001 |
| WO | 02085566 | 10/2002 |
| WO | 2005084867 | 9/2005 |
| WO | 2011041037 | 4/2011 |
| WO | 2011094138 | 8/2011 |
| WO | 2012058164 | 5/2012 |

OTHER PUBLICATIONS

"Should You Build or Buy Wireless Sensors?," Monnit Corporation, Mar. 2011.
"WIT Wireless Sensors: Low Cost, Reliable and Ready to Use," Monnit Corporation, Jun. 2011.
Jelicic, Vana, "Power Management in Wireless Sensor Networks with High-Consuming Sensors," Qualifying Doctoral Examination, University of Zagreb, Apr. 2011, http://www.fer.unizg.hr/_download/repository/VJelicic,KDI.pdf.
Lynch, Jerome P., Kenneth J. Loh, "A Summary Review of Wireless Sensors and Sensor Networks for Structural Health Monitoring," The Shock and Vibration Digest, vol. 38, No. 2, Mar. 1, 2006, pp. 91-128.
Macii, David et al., "Power Consumpton Reduction in Wireless Sensor Networks through Optimal Syncronization," 2009 IEEE Instrumentation and Measurement Technology Conference (I2MTC), May 5-7, 2009, Singapore, IEE, Piscataway, NJ, USA, May 5, 20096, pp. 1346-1351.
Echelon, "PL 3120 / PL 3150 Power Line Smart Transceiver Data Book," Version 2, 005-0154-01C.
Hackl et al., "Digitally Controlled GMA Power Sources," Fronius, www.fronius.com/worldwide/usa/products/paper_digitally_controlld_power_sources_gb.pdf, pp. 1-7, publication date not provided.
Intellon, "CEBus Power Line Encoding and Signaling," White Paper #0027, Mar. 1997, Version 0.1, pp. 1-6.
Canadian Patent Office, Examiner Requisition dated Jan. 31, 2019 in Application No. 2,931,647 (6 pages).

* cited by examiner

WIRELESS AND POWERLINE COMMUNICATIONS IN A WELDING-TYPE SYSTEM

BACKGROUND

The present disclosure relates generally to welding-type systems and, more particularly, controlling power sources remotely.

Welding is a process that has become ubiquitous in various industries for a variety of types of applications. For example, welding is often performed in applications such as shipbuilding, aircraft repair, construction, and so forth. The welding-type systems often include power supplies that may generate power for consumption during the welding process. However, these power supplies may often be remote from a work area, thereby causing delays if a user changes settings of a power supply due to travel to and from the power supply to make the changes.

One type of remote control device may include changing power source settings using a pendant that connects to the controlled power supply via a multi-conductor cable separate from welding cables. However, generally, a cable used to connect to the remotely controlled power supply may be fragile relative to welding cables designed to carry high currents. Damage to the cable may cause the internal power conductors to become shorted. Furthermore, even if the cable were no less fragile than welding cables, the additional cables increase weight to be moved during operation of the welding-type tools and provide an additional point of failure.

Another type of remote control device may include voltage following or sensing using an internal contactor. However, such systems typically provide no convenient way to adjust the output of the welding power supply to compensate for changes in workpiece thickness and/or fit up. Often, such systems also use high current DC contactors to de-energize welding circuits, and such high current DC contactors are relatively large, heavy, and costly. Furthermore, such systems remain energized even when not currently welding.

BRIEF DESCRIPTION

In a first embodiment, a welding-type system includes a wire feeder. The wire feeder includes a wireless network interface configured to connect the wire feeder to a wireless network. The wireless network interface is also configured to receive a wireless command in a first format. The wireless command is configured to control a power supply. Moreover, the wireless network interface is configured to convert the wireless command from the first format to a second format. The wire feeder also includes a wired transceiver configured to transmit the converted wireless command across a power delivery cable to the power supply. Furthermore, the wire feeder includes power terminals configured to receive power from the power supply at a level based at least in part on the transmitted wireless command.

In another embodiment, a welding-type system includes a power supply. The power supply includes a wired transceiver configured to receive commands from a wire feeder through a power cable through which the power supply supplies power to the wire feeder. Moreover, the received commands are wirelessly transmitted to the wire feeder. The power supply also includes a power controller configured to change a level of power supplied to the wire feeder based at least in part on the received commands.

In a further embodiment, a welding-type system includes a wire feeder comprising. The wire feeder includes a wire feed motor and a wireless network interface. The wireless network interface is configured to connect the wire feeder to a wireless network and to receive, via the wireless network, a command in a first format. The wire feeder also includes control circuitry having a wired transceiver configured to exchange communications with a power supply through a power cable through which the power supply supplies power to the wire feeder. The control circuitry is configured to determine whether the command relates to a power level or a wire feed speed. If the command relates to the power level, the control circuitry is configured to convert the command from the first format to a second format and to transmit the command to the power supply via the wired transceiver in the second format. If the command relates to the wire feed speed, the control circuitry is configured to adjust a wire feed speed of the wire feed motor.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

As will be described in detail below, provided herein are systems and methods for viewing and controlling power supplies remotely. By viewing and controlling the power supplies remotely, an operator may weld a workpiece with desired parameters without walking away from the workpiece. In other embodiments, a welding operator may control the parameters of a weld without spending valuable weld time traveling to the power supply to view and control the power supply. Thus, the operator may weld more quickly and efficiently with desired parameters. Furthermore, the operator may confirm welding parameters prior to a weld without substantial delay that may be required when having to walk back to the power supply to change welding parameters. Furthermore, by extending connectivity to the power supply to a wireless network, the operator may control the power supply without being proximate to the welding-type system or the power supply. Furthermore, a hybrid network of welding-type power cable communications and wireless communications can provide faster wireless connections when two endpoint devices maintain a line-of-sight with each other and can provide reliable connectivity between the devices when line-of-sight deployment is difficult or impractical.

In some embodiments, a power source\supply may include a wireless network interface either directly or using a dongle that receives signals from a pendant or pedal that send digital communication signals to control the power source/supply. However, in such embodiments, the power source/supply is often further from the work area than the wire feeder. Thus, such embodiments, though simple, may not be appropriate in industrial work areas where line-of-sight issues exist and/or physical objects block transmission of signals back to the power source/supply. Instead, in such embodiments, the wire feeder may receive digital communication signals and translate the digital communication signals into signals sent over a power cable to the power source/supply. Thus, in embodiments where direct wireless connection between remote device and the power source/supply is obstructed or otherwise interfered with, a wireless connection between the wire feeder and the remote device with a bridged connection between the feeder and the power supply/source provides an extended wireless communication range for the power supply/source wireless control.

Figure 1:
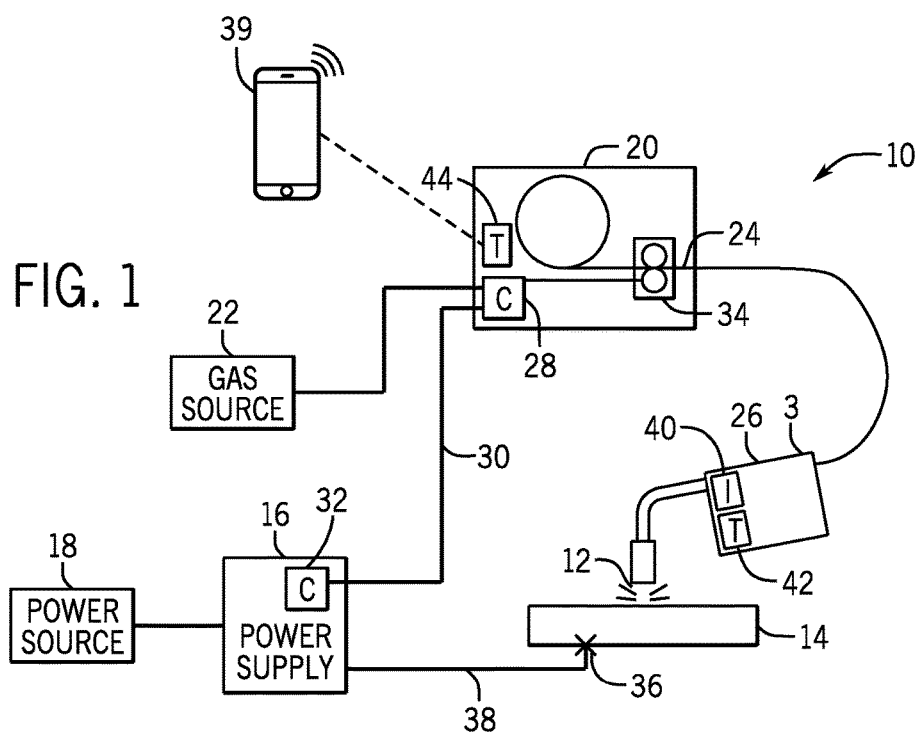
FIG. 1 is a block diagram of an embodiment of a welding-type system utilizing wireless communications.

Turning now to the figures, FIG. 1 is a block diagram of an embodiment of a welding system 10 in accordance with the present techniques. The welding system 10 is designed to produce a welding arc 12 with a workpiece 14 (e.g., pipe). The welding arc 12 may be generated by any type of welding system or process, and may be oriented in any desired manner. For example, such welding systems may include gas metal arc welding (GMAW) systems, and may utilize various programmed waveforms and settings. The welding system 10 includes a power supply 16 that will typically be coupled to a power source 18, such as a power grid. Other power sources may, of course, be utilized including generators, engine-driven power packs, and so forth. In the illustrated embodiment, a wire feeder 20 is coupled to a gas source 22 and the power source 18, and supplies welding wire 24 to a welding torch 26. The welding torch 26 is configured to generate the welding arc 12 between the welding torch 26 and the workpiece 14. The welding wire 24 is fed through the welding torch 26 to the welding arc 12, melted by the welding arc 12, and deposited on the workpiece 14.

The wire feeder 20 may typically include control circuitry 28, which regulates the feed of the welding wire 24 from a spool, and commands the output of the power supply 16 via communications with the power supply 16 over a power supply cable 30, among other things. The power supply cable 30 is used to transmit power from the power supply 16 to the wire feeder 20. Similarly, the power supply 16 may include control circuitry 32 for controlling certain welding parameters and arc-starting parameters and/or receiving changes to such parameters from the control circuitry 28 of the wire feeder. The spool will contain a length of welding wire 24 that is consumed during the welding operation. The welding wire 24 is advanced by a wire drive assembly 34, typically through the use of an electric motor under control of the control circuitry 28. In addition, the workpiece 14 is coupled to the power supply 16 by a clamp 36 connected to a work cable 38 to complete an electrical circuit when the welding arc 12 is established between the welding torch 26 and the workpiece 14.

Placement of the welding torch 26 at a location proximate to the workpiece 14 allows electrical current, which is provided by the power supply 16 and routed to the welding torch 26, to arc from the welding torch 26 to the workpiece 14. As described above, this arcing completes an electrical circuit that includes the power supply 16, the welding torch 26, the workpiece 14, and the work cable 38. Particularly, in operation, electrical current passes from the power supply 16, to the welding torch 26, to the workpiece 14, which is typically connected back to the power supply 16 via the work cable 38. The arc generates a relatively large amount of heat that causes part of the workpiece 14 and the filler metal of the welding wire 24 to transition to a molten state that fuses the materials, forming the weld.

In certain embodiments, to shield the weld area from being oxidized or contaminated during welding, to enhance arc performance, and to improve the resulting weld, the welding-type system 10 may also feed an inert shielding gas to the welding torch 26 from the gas source 22. It is worth noting, however, that a variety of shielding materials for protecting the weld location may be employed in addition to, or in place of, the inert shielding gas, including active gases and particulate solids. Moreover, in other welding processes, such gases may not be used, while the techniques disclosed herein are equally applicable.

Although FIG. 1 illustrates a GMAW system, the presently disclosed techniques may be similarly applied across other types of welding-type systems, including gas tungsten arc welding (GTAW) systems and shielded metal arc welding (SMAW) systems, among others. The welding-type systems may also include systems that are used in other metal-working processes, such as plasma cutting, gouging, induction heating, and so forth. Accordingly, embodiments of the sensor-based power supply controls may be utilized with welding-type systems that include the wire feeder 20 and gas source 22 or with systems that do not include a wire feeder 20 and/or a gas source 22 (e.g., embodiments where the welding torch 26 is directly coupled to the power supply 16), depending on implementation-specific considerations.

Presently disclosed embodiments are directed to remote power supply monitoring, viewing, and control via one or more wireless networks. In some embodiments, data related to the power supply 16 may be sent/received via one or more wireless networks through a weld cable communication channel. In some embodiments, the data may be presented to the operator and/or received from the operator visually or audibly. Furthermore, visual data may include images (or video) of the power supply 16 taken by one or more cameras showing settings of the power supply 16. In certain embodiments, the operator may modify parameters remotely based on the presented parameters. For example, in certain embodiments, the operator may issue commands to increase voltage/current by a relative amount and direction (e.g., +5) or change the voltage/current to a desired absolute amount. In some embodiments, the commands may be detected via a camera, helmet, microphone, motion sensors, and other sensory apparatus in a work area where welding is being performed. Additionally, some commands may be received via an electronic device 39, such as a computer, smart phone, tablet, or other electronic device capable of receiving input from the operator through a wireless device then transmitted to the power supply 16 through a power line.

In some embodiments, the welding torch 26 includes an interface 40 through which the welding torch 26 may receive an indication of a desire to change power settings and/or parameters of the power supply 16. For example, the interface 40 may include a trigger, an electronic display with a graphical user interface, one or more buttons, and/or any other interface that may receive user input to be sent to the control circuitry 28 of the wire feeder 20. The commands received at the welding torch 26 are transmitted to the control circuitry 32 via the power cable 30 using the power line communication discussed herein. In some embodiments, the commands are sent from the welding torch 26 to the control circuitry 32 of the power supply 16 via the control circuitry 28 of the wire feeder 20. In certain embodiments, the commands may be sent from the welding torch 26 to the control circuitry 28 of the wire feeder 20 via a power cable 30 between the wire feeder 20 and the welding torch 26 or via wireless communications between a transceiver 42 of the welding torch 26 and a transceiver 44 of the wire feeder 20. In some embodiments, the welding torch 26 may not have a wireless transceiver 42. Instead, in such embodiments, the welding torch 26 may send all its commands (e.g., trigger depression requested welding-level power) via a wired connection, and the transceiver 44 of the wire feeder 20 receives wireless communications from a smart device 46 (e.g., electronic control panel, smartphone, tablet, personal data assistant, laptop, or desktop computer). In some embodiments, the control circuitry 28 and/or 32 may include one or more transceivers and/or communications controllers to enable communications over the power cable 30. For example, the control circuitry 28 and/or 32 may include a powerline transmitter using LonTalk® communication language and a LonWorks® communications controller or other communications controllers that can provide signal acknowledgement, signal authentication, and priority delivery. In other embodiments, other communications controllers may be used in the control circuitry 28 and 32 as long as the controllers have at least one common mode of communication.

Furthermore, in some embodiments, the power supply 16 also includes a low voltage or secondary supply to provide a low, non-welding voltage across the power cable 30 when the power supply 16 is in a non-welding, stand-by state. The low power supply and main power supply are each controlled by the control circuitry 32.

Figure 2:
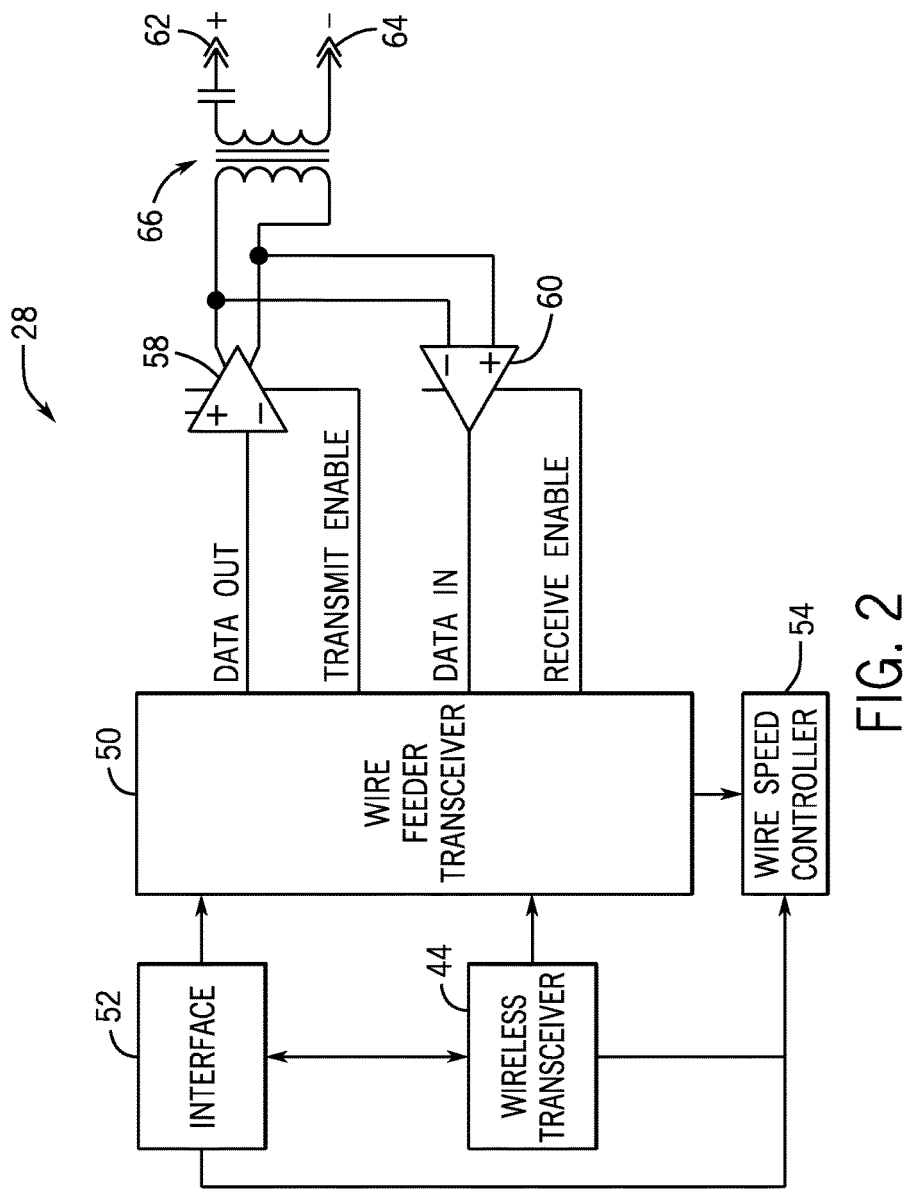
FIG. 2 is a block diagram of an embodiment of wire feeder control circuitry of the welding-type system of FIG. 1.

FIG. 2 illustrates a block diagram of an embodiment of a configuration of the control circuitry 28 of the wire feeder 20 and its associated inputs/outputs. As illustrated, the control circuitry 28 includes a power-line transceiver 50 that is designed to transmit and receive operational data through the power cable 30. The transceiver 50 receives operational set-point data from an interface 52, such as one or more control knobs, buttons, touchscreens, interface 40 of the welding torch 26, and/or other suitable inputs. In some embodiments, transmissions from the interface 52 may be first translated from digital to analog formats before being sent to the wire feeder transceiver 50. In some embodiments, wire speed commands received via the interface 52 are forwarded to a wire speed controller 54 via the transceiver 50, the wireless transceiver 44, or directly from the interface 52 to the wire speed controller 54. The wire speed controller 54 then controls a speed of a motor used to feed the wire to the welding torch 26.

The transceiver 50 transmits operational parameter data in the form of a command signal to the power supply 16 that embodies the commands received at the interface 52 and/or wireless transceiver 44. The command signal may be encapsulated in a defined protocol, such as the LonTalk® protocol, and encoded with a narrow-band binary phase shift keying (BPSK) modulation scheme, but it is contemplated that other modulating protocols may be used, such as quadrature phase shift keying (QPSK). In a further embodiment, narrow-band binary PSK is used to modulate the command signal for transmission to the power supply 16 across the power cable 30.

The control circuitry 28 may also include a pair of amplifiers 58, 60 connected to the transceiver 50. The amplifier 58 facilitates the transmission of data out of the transceiver 50 when properly enabled, and the amplifier 60 facilitates the reception of data for subsequent inputting to the transceiver 50 when properly enabled. Both amplifiers 58, 60 are connected to the power cables 30 via corresponding weld terminals 62, 64 by a coupling transformer 66. The coupling transformer 66 provides galvanic isolation to the weld voltage potential and provides a voltage level translation for translating the control command signal to a level compatible with the weld cables. The coupling transformer 66 may also provide impedance matching. In a further embodiment, an improved signal-to-noise ratio (SNR) can be achieved by additionally coupling resonant circuits at the terminations of weld cable 16 and attenuating high frequency noise across the weld terminals of the power source 18.

Figure 3:
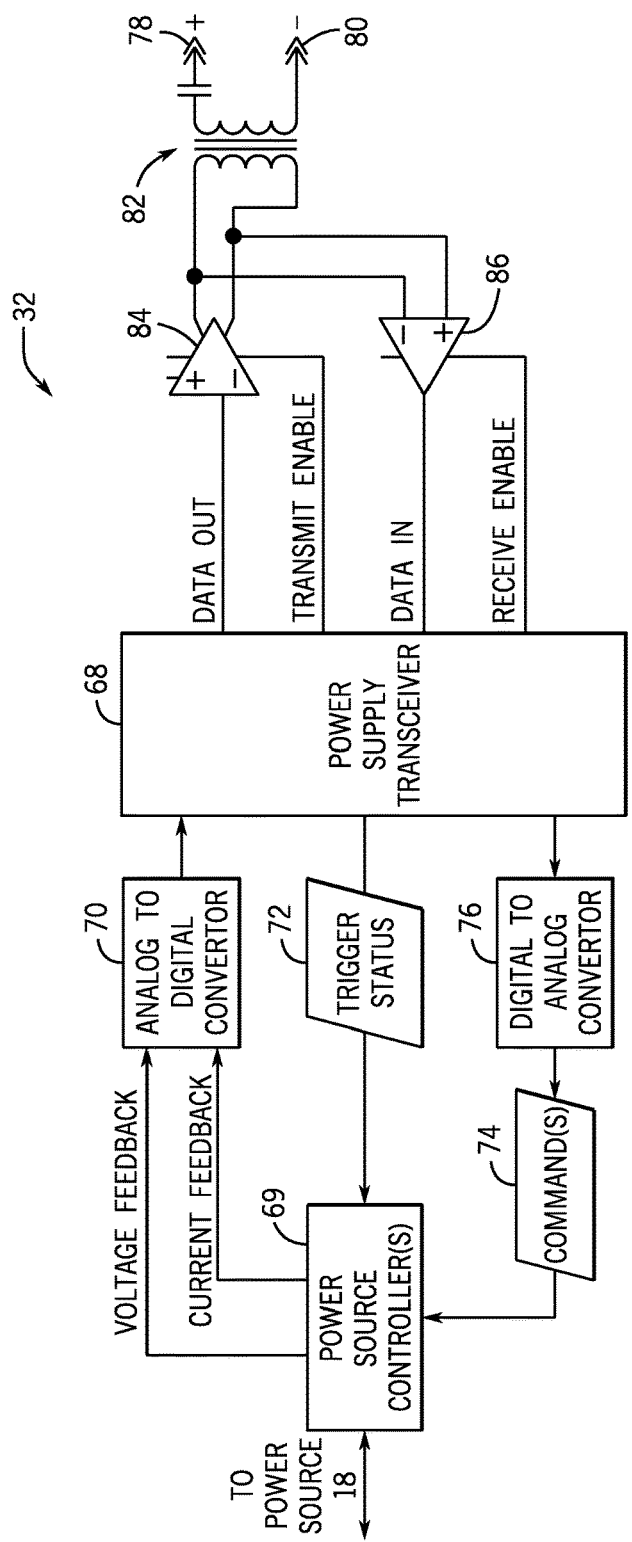
FIG. 3 is a block diagram of an embodiment of power supply control circuitry of the welding-type system of FIG. 1.
Figure 4:
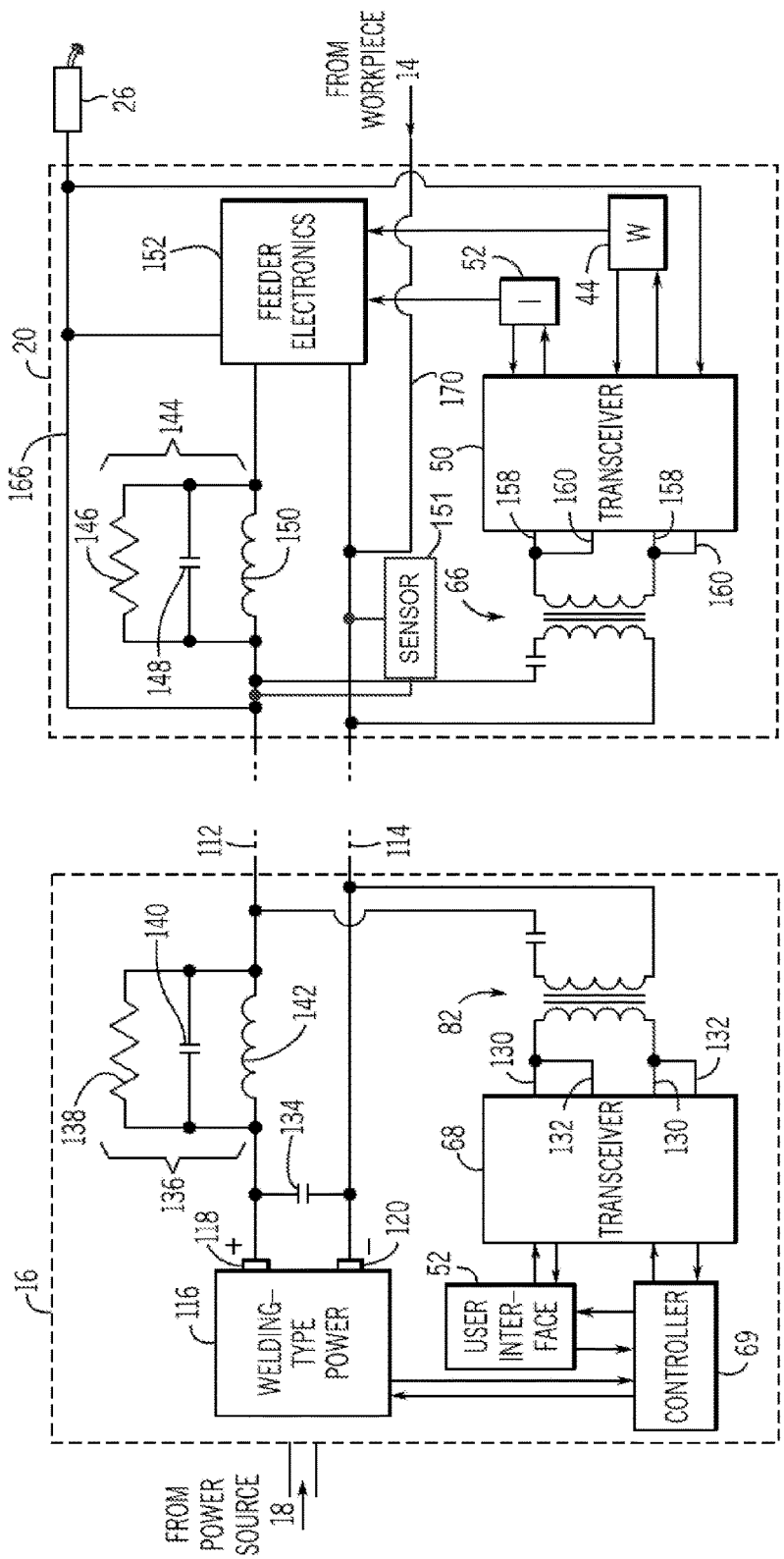
FIG. 4 is a block diagram of an embodiment of interconnection between a wire feeder and power supply of the welding-type system of FIG. 1.

Referring now to FIG. 3, a block diagram illustrates an embodiment of the power supply control circuitry 32 and its associated inputs/outputs. Like the wire feeder control circuitry 28, the power supply control circuitry 32 includes a power supply transceiver 68 to facilitate communication between the power supply 16 and the wire feeder 20. The transceiver 68 is connected to receive voltage and current feedback from a power supply controller 69 through an analog-to-digital converter 70. In this regard, the power supply controller 69, which controls operation of one or more power supplies 16, provides feedback as the voltage and current levels the power supply 16 is providing, which can be subsequently transmitted to the wire feeder 20. Accordingly, as shown in FIG. 4, the wire feeder 20 may include voltage and/or current sensors 151 that may compare the commanded and/or supplied voltage/current levels to sensed voltage/current levels to determine if the system is operating properly. If the sensed levels do not match the commanded and/or supplied voltage/current levels, the interface 52 may provide an alert to the user.

As referenced above, in addition to operational parameter data, the wire feeder 20 may also provide a trigger status signal 72 to the power supply 16. The trigger status signal 72 allows the power supply controller 69 to selectively toggle power connection between the power supply 16 and the wire feeder 20 at the welding level. For example, the trigger status signal 72 may cause the power supply controller 69 to toggle a contactor that when open blocks delivery of welding power to the wire feeder 20 and when closed enables delivery of welding power to the wire feeder 20. In addition to providing a trigger status 72 message to the controller 69, in certain embodiments, the transceiver 68 communicates a command signal 74 to the controller 32 through a digital-to-analog converter 76.

As previously discussed, the power supply 16 may include a primary as well as a secondary supply from one or more sources. In such embodiments, the secondary supply may have a secondary contactor. The secondary contactor, when closed, closes a secondary power circuit between the power supply 16 and the wire feeder 20 across the power cable 30. This secondary power circuit can be used to supply a non-welding power between the power supply 16 and the wire feeder 20. Since the secondary contactor provides lesser voltage, the secondary contactor may be much smaller than a primary contactor. By utilizing a secondary contactor in addition to the primary contactor, the power supply 16 can supply sufficient power to the wire feeder 20 for electronics of the wire feeder 20 without the need for a large open circuit voltage between the power supply 16 and wire feeder 20, or a battery in the wire feeder 20 to power the wire feeder 20. In an alternative embodiment, the wire feeder 20 may include a battery that stores energy that is recaptured in the welding process (e.g., motion powered, heat recovery, and/or parasitic charging from an electric charge).

Similar to the transceiver 50 of the wire feeder 20, the transceiver 68 is also connected to weld terminals 78, 80 via a coupling transformer 82 and amplifiers 84, 86. The coupling transformer 82 provides similar functionality as the coupling transformer 66 in the wire feeder 20. The amplifier 84, when enabled, supports the transmission of data from the power source 18 to the wire feeder 20 across the power cables 30. The amplifier 86, when enabled, facilitates the reception of data from the wire feeder 20 across the power cable 30.

In some embodiments, the control command messages 74 are encapsulated in the LonTalk® protocol and encoded with a BPSK modulation scheme and transmitted over the weld circuit using one or more carriers to provide a robust communications link between the power supply 16 and the wire feeder 20. That is, communication between the power supply 16 and the wire feeder 20 is through narrow-band binary PSK digital modulation in the CENELEC A and CENELEC C bands of operation.

FIG. 4 is a schematic diagram of an embodiment of the wire feeder 20 and the power supply 16 incorporating a transmission assembly 100. The power supply 16 is operably connected to the wire feeder 20 via weld cables 112 and 114 (both included in the power cable 30) to deliver welding power to the wire feeder 20. In accordance with embodiments described herein, the power supply 16 may also provide secondary or standby power to wire feeder 20. That is, either power circuit 116 may be configured to provide two outputs or a secondary power supply may be included to provide a second output of power supply 16 from the power source(s) 18. In either case, power from the power supply 16 is supplied at terminals 118, 120 to which cables 112, 114 are connected. As illustrated, the power supply 16 is equipped with the controller 69 to control the welding parameters and outputs of power supply 16. Optionally, the interface 52 may be included so that operators can control power supply outputs and modes, wire feed, and other welding parameters from the power supply 16. User interface 54 may take the form of knobs, switches, buttons, or more advanced controls such as LCD or touch screen displays.

Additionally, the power supply 16 includes the transceiver 68 for communication across cables 112, 114 with the wire feeder 20. As shown, the transceiver 68 includes a pair of inputs 130 for receiving data and a pair of outputs 132 for transmitting data. Transmitted data may include control commands from the interface 52 or controller 69. However, in certain embodiments, the transceiver 68 may be a receiver having only inputs 130. The transceiver 68 is connected to weld cables 112, 114 via the coupling transformer 82.

As described above, the transceiver 68 operates to receive data by decoding control signals and commands encoded on a carrier wave at a given frequency applied across either or both of weld cables 112, 114 by wire feeder 20. The transceiver 68 may also transmit information by encoding it onto a carrier wave of a corresponding frequency and applying the encoded carrier wave across either or both of weld cables 112, 114. Thus, operators may set wire feed settings and other control parameters for the wire feeder 20 via the interface 52. The controller 69 receives the settings from the interface 52 and converts them to encodable commands for transmission via the protocol of the transceiver 68.

To improve the quality of signal transmission over the weld cables 112, 114, a circuit may preferably be electrically connected with the weld cables 112, 114 to improve SNR and/or increase impedance at a frequency of interest (preferably corresponding to the carrier frequency of the transceiver 68). Cables of high power systems may exhibit high frequency noise when conducting power to a load. This noise can be extremely distortive of data signals transmitted across the cables, significantly lowering SNR. One manner of reducing such noise and thereby improving SNR is to include a low-pass filter 134 across the terminals 118, 120 of the high power system. In essence, a capacitor 134 can act as a low-pass filter, removing noise in the appropriate band by attenuating frequencies higher than the frequency of interest. The frequency at which the filter begins attenuating or blocking noise may be any desired frequency higher than the frequency of interest, and may be within a variety of ranges from the frequency of interest depending upon the bands of noise generated by the power source 18. One of skill in the art will also appreciate that many types of low-pass filters may be utilized to reduce or eliminate noise, including both passive and active filters, such as op-amp filters, transistor based filters, and the like.

In addition, those skilled in the art will recognize that the output terminals 118, 120 of the power supply 16 create low-impedance terminations on the weld cables 112, 114, which may cause significant injection loss and result in poor signal quality. This phenomenon may actually be accentuated by the inclusion of some types of low-pass filters at the outputs 118, 120 of the power supply 16. One method of increasing impedance at the terminations of the weld cables 112, 114 for the transmission frequency is to include a resonant circuit 136 on the weld cables 112, 114 near the terminals 118, 120 of the power supply 16, as shown. In certain embodiments, a resonant circuit 136 of the power supply 16 may be an LC tank circuit. The inductive 142 and capacitive 140 components determine the frequency at which the resonant circuit 136 will resonate, with the resistive component 138 adding the peak impedance. Therefore, by proper selection of these components, the peak impedance of the resonant circuit 136 may be set at the transmission frequency of the transceiver 68, and injection loss is accordingly reduced.

In some embodiments, the transceiver 68 is configured to transmit control information at a first frequency, and if no response is received from the wire feeder 20, the transceiver 68 automatically or selectively re-transmits the information at a second frequency. Thus, it may be desirable to simply set the peak impedance of the resonant circuit 136 at an average frequency of the frequencies at which the transceiver 68 transmits. An alternative to incorporating such a resonant circuit would be to include two resonant circuits, each having a peak impedance at a transmission frequency of the transceiver 68. However, the resonant circuit 136 may also be adaptable to set peak impedance at multiple frequencies to match the frequency at which the transceiver 68 (or the transformer 66 of the wire feeder 20) is transmitting. For example, the resonant circuit 126 may be comprised of two or more resonant circuits corresponding to frequencies of transmission which are switched or otherwise selectively applied on the weld cables 112, 114 by a controller of the transceiver 68 or the transformer 66. Alternatively, the capacitive 140, inductive 142, and/or resistive 138 components of the resonant circuit 136 could be variable components such that one resonant circuit 136 could achieve peak impedances at multiple frequencies.

Similar to the power supply 16, the wire feeder 20 also includes the power line transceiver 50 having input 158 and output 160 lines coupled to the weld cables 112, 114 via the coupling transformer 66. It is recognized, however, that the transformer 66 may be merely a transmitter for uni-directional communication with the power supply 16. As described above, communication between the power supply 16 and the wire feeder 20 is achieved by transmission of PSK encoded signals over the weld cables 112, 114. Preferably, the signals are transmitted via a protocol particularly suitable for power line transmissions, such as the LonTalk® protocol. Signals transmitted from the transformer 66 to the power supply 16 may include control commands such as voltage and current settings, output modes, trigger signals, ON-OFF commands, and wire feed settings.

To improve signal quality of both transmitted and received control commands, a resonant circuit 144 is connected on the weld cable 112 to provide increased impedance at its termination. The frequency at which the peak impedance is provided depends upon the selection of the capacitive 148 and inductive 150 components of the resonant circuit 144. Also, to accommodate varying transmission or carrier frequencies of the transformer 66, the resonant circuit 144 may provide peak impedance at an average frequency, at two or more frequencies, or at variable frequencies, as described above.

In the embodiment depicted, a voltage setting control 162 and a wire feed control 164 provide control signals and settings which are communicated either to the transformer 66 to be transmitted to the power supply 16 or to feeder electronics 152, such as the wire feed motor. The interface 52 may be bi-directionally connected to the the transformer 66 so that control commands from the interface 52 of the power supply 16 may be communicated thereto. Thus, when an operator selects a power output or mode for the power supply 16 via the controls 162, 164, the selection is converted to a control command, encoded on a carrier frequency, received by the transceiver 68 of the power supply 16, processed by the controller 69, and the power supply 16 will accordingly provide the selected output (i.e. welding power, standby power, no power, voltage/current control, constant current, constant voltage, etc). Similarly, whether received from the power supply 16, directly from the interface 52, or the wireless transceiver 44, the wire feeder electronics 152 operate under input parameters.

As illustrated, the wire feeder 20 includes a wireless transceiver 44 that extends connectivity to the power supply 16 to devices that may wirelessly connect to the wireless transceiver 44. Additionally or alternatively, in certain embodiments, one or more wireless transceivers may be located in the power supply 16, the power source 18, the welding torch 26, and/or some other location within the welding type system. In some embodiments, the wireless transceiver 44 may include one or more wireless network interfaces, such as BlueTooth®, 802.11, 802.15.4 (e.g., ZigBee®), or other wireless network interfaces. In other words, the wireless transceiver 44 provides connectivity to network enabled devices, such as the electronic device 39 which may include phones, tablets, and computers, to connect to the power supply 16 to control the power supply 16 and/or the power source 18 from a location other than the wire feeder 20, the power supply 16, and/or the power source 18. For example, a mobile device may be used to disable a power source 18 and/or power supply 16 when an operator has inadvertently exited a welding area while the welding-type system 10 is still active. Furthermore, in some embodiments, the wireless transceiver 44 may connect to a router that provides a connection to the Internet. Thus, in such embodiments, the operator may control a state of the welding-type system 10 from any location from which the operator may connect to the Internet. For example, the operator may use a web browser or application program to control the power supply 16 and/or power source 18 via the Internet.

As shown, the weld cable 112 provides power directly to the welding torch 26 via a power line 166 and the weld cable 114 is electrically coupled to the workpiece 14 via the line 170. The weld cables 112, 114 also provide power to the feeder electronics 152, through the resonant circuit 144. In some embodiments, the welding torch 26 includes a trigger sensor (not shown) that is connected to the transformer 66 to provide trigger signal feedback over the weld cables 112, 114. Therefore, the power supply 16 may be switched from a standby or OFF state to an ON or welding-power state simply by engagement of the welding torch 26 and/or remote control via the wireless transceiver 44.

Figure 5:
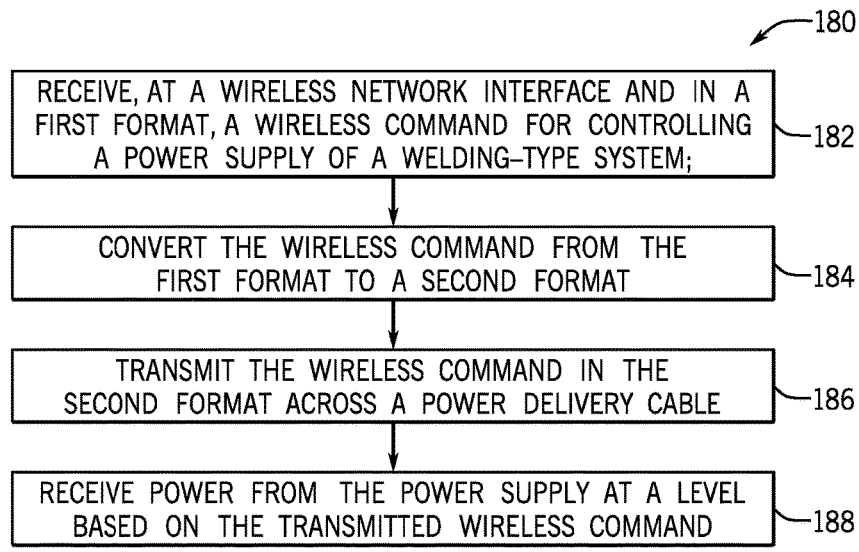
FIG. 5 is an embodiment of an image of a working view that may be displayed by the display of FIG. 2.

FIG. 5 illustrates an embodiment of a process 180 for remotely controlling the power supply 16 of the welding-type system 10. The wire feeder 20 receives, at a wireless network interface of the wire feeder 20 and in a first format, a wireless command for controlling a power supply of the welding type system 10 (block 182). For example, the wire feeder 20 may receive a lower voltage (e.g., −10V) command through a wireless network interface (e.g., 802.11, 802.1, 802.15.4, etc.) The wire feeder 20 converts the wireless command from the first format to a second format (block 184). For example, the wire feeder 20 may convert the wireless command from an understood command in an 802.11 transmission format to an understood LonTalk® format (block 186). The wire feeder 20 then transmits the wireless command to the power supply 16 in the second format across a power delivery cable 30 that delivers power from the power supply 16 to the wire feeder 20 (block 188). The wire feeder 20 then receives power from the power supply 16 at a level based on the transmitted wireless command (block 190). For example, the new level may be 10V lower than the previously supplied power level.

Figure 6:
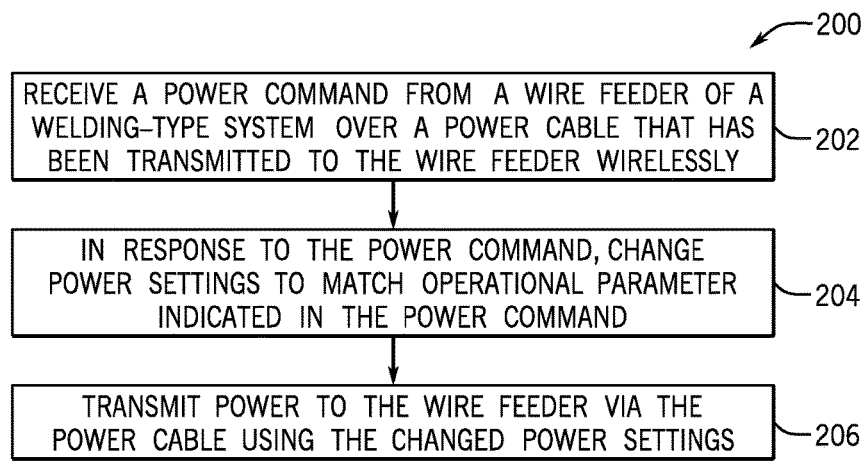
FIG. 6 is an embodiment of an image of a parameter adjustment view that may be displayed by the display of FIG. 2.

FIG. 6 illustrates an embodiment of a process 200 for receiving remote control communications at a power supply 16 of the welding-type system 10. The power supply 16 receives a power command from a wire feeder 20 of a welding-type system over a power cable 30, where the power command has been received by the wire feeder 20 wirelessly (block 202). The power supply 16 then, in response to the power command, changes power settings to match an operational parameter indicated in the power command (block 204). The power supply 16 then, using the changed power settings, provides power to the wire feeder 20 for a welding-type process (block 206). For example, the new level may be 10V lower than a previous level when the command includes a reduce voltage by 10 volts command. In some embodiments, the provided power may be at a level of 0V (e.g., off) by disconnecting the power source 18 from the wire feeder 20 or the level may be an idle level lower than a welding level.

Although the foregoing discussion generally relates to welding torches, in some embodiments, wireless transceiver control may be used for any welding-type tool or accessory associated with a welding-type process. As used herein, welding-type refers to any process related to welding, such as welding, cutting, or gouging. Furthermore, a welding-type tool or accessory may be any tool or accessory using in such processes. For example, welding-type tools may include torches, electrode holders, machining tools, or other similar tools that may be used in the welding-type processes.

Moreover, in some embodiments, the devices in the welding-type system 10 may have a priority of communication paths through which to communicate. For example, the devices may attempt to communicate via a wireless connection first. However, if no wireless connection between the devices is available, the signal strength is below a threshold strength, or a transfer speed is below a threshold speed (e.g., speed of wired communications), the devices within the welding-type system 10 may instead use the wired connection via a power cable 30.

Additionally or alternatively, the portion of the welding-type system 10 (e.g., wire feeder 20) receiving a wireless command may determine whether the command pertains to the receiving device. For example, the received data may have one or more bits that indicate a destination for the command (e.g., a 0 for the wire feeder 20 and a 1 for the power supply 16). Thus, the receiving device may determine whether the device should forward the communication through a wired connection (e.g., act as a network bridge or router) by examining a wrapper for the information.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A welding-type system comprising:
   a wire feeder comprising:
      a wireless network interface configured to:
         connect the wire feeder to a wireless network;
         receive a wireless power supply command in a first format, wherein the wireless power supply command is configured to control a power supply; and
         convert the wireless power supply command from the first format to a second format;
      a wired transceiver configured to transmit the converted wireless power supply command across a power delivery cable to the power supply and receive power supply feedback information and wire feeder commands transmitted across the power delivery cable from the power supply; and
      power terminals configured to receive power from the power supply at a level based at least in part on the transmitted wireless power supply command; and
   wherein the power supply feedback information comprises a data signal corresponding to at least one of an output voltage level or an output current level provided by the power supply to the power delivery cable.

2. The welding-type system of claim 1, wherein the wireless network comprises an 802.11 wireless network, an 802.15.4 wireless network, or an 802.1 wireless network.

3. The welding-type system of claim 1, wherein the wired transceiver is configured to transmit the converted wireless power supply command using binary phase shift keying (BPSK) modulation, quadrature phase shift keying (QPSK) modulation, or M-Ary phase shift keying modulation.

4. The welding-type system of claim 1, wherein the Wire feeder comprises a wire feed motor, and the wireless network interface is configured to receive a wire feed speed command and transmit the wire feed speed command to the wire feed motor, and the wire feed motor is configured to alter a wire feed speed based on the wire feed speed command.

5. The welding-type system of claim 1, comprising the power supply having a power supply wireless interface.

6. The welding-type system of claim 5, wherein the power supply wireless interface has a same network type as the wireless network interface of the wire feeder, and the wireless network interface of the wire feeder and the power supply wireless interface are configured to interchange commands when a signal strength between the wireless network interface of the wire feeder and the power supply wireless interface surpasses a signal strength threshold.

7. The welding-type system of claim 6, wherein when the signal strength between the wireless network interface of the wire feeder and the power supply wireless interface does not surpass the signal strength threshold, the power supply and the wire feeder are configured to communicate via the wired transceiver of the wire feeder.

8. The welding-type system of claim 5, wherein the power supply wireless interface has a same network type as the wireless network interface of the wire feeder, and the wireless network interface of the wire feeder and the power supply wireless interface are configured to interchange commands when a transfer speed between the wireless network interface of the wire feeder and the power supply wireless interface surpasses a transfer speed threshold.

9. The welding-type system of claim 8, wherein when the transfer speed between the wireless network interface of the wire feeder and the power supply wireless interface does not surpass the transfer speed threshold, the power supply and the wire feeder are configured to communicate via the wired transceiver of the wire feeder.

10. The welding-type system of claim 1 wherein the wire feeder further comprises a sensors to measure characteristics of the received power, and wherein the wire feeder is further configured to compare the measured characteristics of the received power to the received power supply feedback information, and signal an alert if the measured characteristics of the received power do not match the power supply feedback information.

11. The welding-type system of claim 1, wherein the wire feeder further comprises a sensor to measure characteristics of the received power, and wherein the wire feeder is further configured to compare the measured characteristics of the received power to commanded power supply characteristics, and signal an alert if the measured characteristics of the received power do not match the power supply feedback information.

12. The welding-type system of claim 1 wherein the wired transceiver is further configured to transmit measured voltage data at the wire feeder to the power supply to allow for control of the received power during a welding operation.

13. A welding-type system comprising:
   a power supply comprising:
      a wired transceiver configured to both receive power supply commands from a wire feeder and transmit power supply feedback information and wire feeder commands through a power cable through which the power supply supplies power to the wire feeder, wherein the received power supply commands are wirelessly transmitted to the wire feeder, and wherein the power supply feedback information comprises a data signal corresponding to at least one of the output voltage level or the output current level provided by the power supply to the power cable; and
      a power controller configured to change a level of power supplied to the wire feeder based at least in part on the received power supply commands.

14. The welding-type system of claim 13, wherein the power supply comprises a wireless network interface configured to couple the power supply to one or more remote devices.

15. The welding-type system of claim 14, wherein the wireless network interface is configured to receive wire feed speed commands, and the wired transceiver is configured to transmit the wire feed speed commands to the wire feeder through the power cable.

16. The welding-type system of claim 14, wherein the wireless network interface is configured to receive a command from a cellular phone, a tablet, or a computing device.

17. A welding-type system comprising:
    a wire feeder comprising:
        a wire feed motor;
        a wireless network interface configured to:
            connect the wire feeder to a wireless network; and
            receive, via the wireless network, a command in a first format; and
        control circuitry having a wired transceiver configured to transmit commands to and receive feedback information from a power supply through a power cable through which the power supply supplies power to the wire feeder, wherein the control circuitry is configured to:
        determine whether the command relates to a power level or a wire feed speed;
        if the command relates to the power level, convert the command from the first format to a second format and transmit the command to the power supply via the wired transceiver in the second format; and
        if the command relates to the wire feed speed, adjust a wire feed speed of the wire feed motor; and
    wherein the power supply feedback information comprises a data signal corresponding to at least one of an output voltage level or an output current level provided by the power supply.

18. The welding-type system of claim 17, wherein the command comprises a relative change in power.

19. The welding-type system of claim 17, wherein the command comprises an absolute change in power.

20. The welding-type system of claim 17, wherein the control circuitry is configured to receive the command from a mobile computing device.

* * * * *